ize of 0.10–0.50μ, and the emulsion contains a
United States Patent

Ogura et al.

Patent Number: 5,788,879
Date of Patent: Aug. 4, 1998

[54] DUST-PREVENTING METHOD

[76] Inventors: Masatsune Ogura, 16-11, Arai 1-chome, Ichikawa-city, Chiba-Prefecture 272-01; Shizuo Chiba, 10-5, Ishikawasinmachi, Shimizu-City, Sizuoka-Prefecture 424; Teruo Urano, 775-3, Ishizukacho, Sano-City, Tochigi-Prefecture 327 -01; Hiroshi Miyaji, 925-4, Nishikawadacho, Utsonomiya-City, Tochigi-Prefecture 272-01; Tetsuya Shimoda, 1397-3, Hatsuzawacho, Hachioji-City, Tokyo 193; Tomohiro Gocho, 4-6, Kohudai Hujishirocho 1-Chome, Kitasoma-Gun, Ibaragi-Prefecture 300-15, all of Japan

[21] Appl. No.: 596,241

[22] PCT Filed: Jul. 3, 1995

[86] PCT No.: PCT/JP95/01324

§ 371 Date: Feb. 6, 1997

§ 102(e) Date: Feb. 6, 1997

[87] PCT Pub. No.: WO96/01881

PCT Pub. Date: Jan. 25, 1996

[30] Foreign Application Priority Data

Jul. 11, 1994 [JP] Japan ................... 6-180487

[51] Int. Cl.$^6$ ................... C09K 3/22
[52] U.S. Cl. ................ 252/88.1; 427/212; 427/221; 44/602
[58] Field of Search ................ 252/88.1; 427/212; 1/221; 44/602

[56] References Cited

U.S. PATENT DOCUMENTS

| 3,838,092 | 9/1974 | Vogt et al. | 260/33.6 |
|---|---|---|---|
| 4,067,818 | 1/1978 | Marin | 252/88.1 |
| 4,746,543 | 5/1988 | Zinkan et al. | 252/88.1 |
| 5,256,444 | 10/1993 | Roe | 427/221 |
| 5,480,584 | 1/1996 | Urano et al. | 427/221 |

*Primary Examiner*—Jacqueline V. Howard
*Assistant Examiner*—Cephia D. Toomer
*Attorney, Agent, or Firm*—Pillsbury, Madison & Sutro, IP Group of Cushman, Darby & Cushman

[57] ABSTRACT

In a method for preventing dust of a powdery material by mixing the powdery material with a polytetrafluoroethylene and subjecting the mixture to a compression-shearing action taken at temperatures from about 20° to 200° C. thereby the polytetrafluoroethylene is fibrillated to prevent dusting of the powdery material, the method is characterized by that polytetrafluoroethylene is an aqueous emulsion of a homopolymer of tetrafluoroethylene, the homopolymer has a specific gravity of not larger than 2.20 and an average particle size of 0.10–0.50μ, and the emulsion contains a hydrocarbon-base anionic surfactant of not less than 1.0 wt % of the polytetrafluoroethylene as the emulsion stabilizer. The emulsion is highly stable and a less possible contaminant of underground water.

4 Claims, No Drawings

DUST-PREVENTING METHOD

This application claims benefit of international application PCT/JP95/01324 filed Jul. 3, 1995.

TECHNICAL FIELD

The present invention relates to a method for preventing dust of a powdery material by use of a highly dust-preventive polytetrafluoroethylene (hereinafter referred to as PTFE).

BACKGROUND ART

Japanese Patent Publication No.52-32877 discloses a method for preventing dust of a powdery material by mixing the powdery material with PTFE and subjecting the mixture to compression-shearing at a temperature from about 20° to 200° C., thereby fibrillating the PTFE to prevent dusting of the powdery material. The PTFE disclosed therein includes fine powder or emulsion form of homopolymer of tetrafluoroethylene denoted by TEFLON® 6 or TEFLON® 30, and also fine powder or emulsion form of modified polymer of tetrafluoroethylene denoted by TEFLON® 6C or TEFLON® 64. Thereafter, "TEFLON® K-10" (PTFE fine powder) and "TEFLON® K-20" (PTFE emulsion) were developed and have being marketed for dust-preventing usages.

With regard to the above PTFE, however, there occur fluctuation in the dust-preventing effect due to insufficient fibrillation, unsatisfactory strength of fibrils and uneven distribution of PTFE in the powdery material. Especially for the dust preventing agent in an emulsion type, there are problems related to the emulsion itself such as separation and coagulation of PTFE colloidal particulates caused by mechanical actions during transportation, weighing and dilution thereof, which bring about clogging of pipes, pumps, orifices, etc., and further decrease concentration of PTFE in the emulsion to cause erroneous mixing rate of PTFE to a powdery material. Moreover, as the result of using a large amount of emulsion type dust preventing agents for such powdery materials as fertilizers, soil stabilizers and reclamation materials like coal ash, surfactants employed as the emulsion stabilizer have become possible contaminants of underground water, lakes, rivers, etc.

The present invention aims at providing a method for preventing efficiently dust of powdery materials by use of an aqueous emulsion of tetrafluoroethylene homopolymer, which emulsion being highly stable and a less possible contaminant of underground water.

DISCLOSURE OF THE INVENTION

According to the present invention of a method for preventing dust of a powdery material by mixing the powdery material with PTFE and subjecting the mixture to a compression-shearing action taken at temperatures from about 20° to 200° C. thereby the PTFE is fibrillated to prevent dusting of the powdery material, the method is characterized by that the PTFE used is an aqueous emulsion of tetrafluoroethylene homopolymer, the homopolymer has a specific gravity of not larger than 2.20 and an average particle size of 0.10–0.50µ, and the emulsion contains a hydrocarbon-based anionic surfactant of not less than 1.0 wt % of PTFE as a emulsion stabilizer.

BEST MODE FOR CARRYING OUT THE INVENTION

The PTFE usable for the present invention is a homopolymer, though PTFE includes a so-called homopolymer of tetrafluoroethylene and a so-called modified polymer being a copolymer of tetrafluoroethylene and a comonomer of not more than 1%. A dust preventing agent using an aqueous emulsion of the modified PTFE polymer exhibits a dust preventing effect inferior to that of the present invention, and frequently requires over 50% excessive amounts of the agent to show the same effect.

The PTFE suitable for the present invention has an average particle size range of 0.10–0.50µ, preferably 0.10–0.30µ, and a specific gravity of not larger than 2.20, preferably not larger than 2.18. Colloidal particles having an average particle size of smaller than 0.10µ result inferior dust preventing effect, and those of larger than 0.50µ brings about unstable emulsions. PTFE having a specific gravity of larger than 2.20 results an inferior dust preventing effect. The average particle size of PTFE particles can be determined by a centrifugal sedimentation method, and a particle size distribution measuring equipment of centrifugal sedimentation type (Shimazu Corp.; SA-CP4L) was used for the present invention. The specific gravity was measured by using coagulated colloidal particles in accordance with the method described in U.S. Pat. No. 3,142,665.

The above-mentioned PTFE particles are obtainable by such emulsion polymerization methods as disclosed in U.S. Pat. No.2,559,752, in which tetrafluoroethylene is charged under pressure into an aqueous medium containing an water-soluble polymerization initiator and an anionic surfactant having hydrophobic fluoroalkyl radicals as the emulsifier so as to be polymerized to form the PTFE aqueous emulsion. However, since PTFE aqueous emulsions thus obtained are inferior in the stability, the emulsion needs further addition of an emulsion stabilizer.

Emulsion stabilizers used for the present invention are hydrocarbon-base anionic surfactants, which avert contamination of rivers, lakes and underground water caused by the surfactants because of their forming salts insoluble or hardly soluble to water by reacting with calcium, aluminum and iron being components of soil essentially. Mention is made of such hydrocarbon-base anionic surfactants as salts of higher fatty acid, salts of higher alcohol sulfuric acid ester, salts of fatty oil sulfuric acid ester, salts of aliphatic alcohol phosphoric acid ester, salts of dibasic fatty acid ester sulfonate, salts of alkylaryl sulfonate, etc. Among them, Na, K, Li and $NH_4$ salts of polyoxyethylene-alkylphenylether-ethylenesulfonate having —$(CH_2CH_2O)_{1-6}$— and $C_{8-11}$ alkyl, alkylbenzenesulfonate having $C_{10-12}$ alkyl and dialkylsulfosuccinic acid ester having $C_{8-10}$ alkyl are exemplified as preferable ones for providing the PTFE aqueous emulsions having a high mechanical stability. The amount of emulsion stabilizer to be added is not less than 1.0 wt %, preferably 1.5–5 wt %, of PTFE. An amount less than 1.0 wt % provides unsatisfactorily stabilized aqueous PTFE emulsions, and that larger than 10 wt % is uneconomical.

Although the content of PTFE in the emulsion is not restricted specifically, a lower content is preferred for improved dispersion of PTFE into dusting materials. On the other hand, a higher content can reduce transportation costs of the emulsion. Thus, the content of PTFE is usually not lower than 10 wt % and is preferably 20–70 wt %. A further higher content is not favored because it deteriorates the emulsion stability. Accordingly, it is usual that a commercial dust preventing agent has a PTFE content of 20–70 wt %, and the product is diluted with water to make the PTFE content below 5 wt % prior to mixing with dusting materials.

The mechanical stability of aqueous PTFE emulsion can be evaluated by observation of increased ratio of apparent sizes of associated colloidal particles resulting from collisions during high speed agitation of the emulsion. And a part of coagulated colloidal particles caused by agitation adhere to the agitating rotor and wall of container, or form flocks separating from the emulsion. Under occurrence of these phenomenon, the emulsion is regarded as having an inferior stability, despite of changes in size of colloidal particles remaining in the emulsion.

In the present invention, the mechanical stability is determined by the increased ratio of particle size measured according to the following procedure. Into a beaker of 60 mm inner diameter is charged 200 ml of an emulsion having an average particle size of $S_1$. An agitator (URTRA-TURRAX: JANKE & KUNKEL GMBH & Co. KG) having a shaft with a generator is put on so as the shaft is 15 mm above the bottom of beaker and decentered by 5mm. After the rotor is rotated at 20,500 rpm for 5 minutes, the average particle size ($S_2$) of emulsion is measured. The increased ratio of particle size is calculated as follows:

Increased ratio of particle size(%)=$(S_2-S_1)/S_1 \times 100$

The mechanical stability is assessed as follows:

Good when "increased ratio of particle size" is >0%–<5%.

Normal when "increased ratio of particle size" is >5%–<10%.

Poor when "increased ratio of particle size" is >10%. Further, Poor is rated when a large amount of coagulated particles appear by the agitation.

The dust preventing rate is determined according to the following procedure. From one end of a box-type air duct of 34 cm height×23 cm width×1.8 m length is passed air having a velocity of 0.25 m/sec by use of a blower. Through a 2 cm diameter outlet of funnel put above the outlet of the duct, a dust prevented slaked lime is subjected to fall with a constant rate (3-log/sec), and the lime accumulated on a 34 cm×34 cm tray placed under the outlet is regarded as the amount of dust prevented lime. The dust preventing rate is calculated as follows:

Dust preventing rate (%)=Weight of dust prevented lime/Weight of dropped lime×100

Test 1

Each 18 ml of an aqueous PTFE emulsion A, B, C, D, E, F, G or H mentioned in Tables 1 and 2 was mixed with 800 ml of water, and the mixture was sprayed respectively on 20 kg of quick lime having a particle size not more than 5 mm. The quick lime mixed with the PTFE emulsion was subjected to compression-shearing for 2 minutes in a 50 liter mortar mixer, during which temperature of the content in the mixer raised due to the reaction between the quick lime and water in the aqueous emulsion and generated steam to remove water materially. Thus, a dust prevented quick lime containing a small amount of slaked lime formed by the reaction between quick lime and water was obtained. Dust preventing rate was measured for each quick lime sample thus obtained, and the result is shown in Tables 1 and 2. It is noticed that each Example using an aqueous PTFE emulsion of the present invention A, B, C or D indicates a dust preventing rate higher than that of a Comparative Example using emulsion F having a specific gravity of PTFE particle of larger than 2.20 or an emulsion G being an aqueous emulsion of a modified PTFE. Further, a Comparative Example using an emulsion E containing 0.5 wt % of the emulsion stabilizer was impracticable due to coagulation of the emulsion.

Test 2

Portland cement was prepared by mixing cement clinker with a suitable amount of gypsum and grinding the mixture in a finishing mill. The product had a particle size of 1.1% residue on 88μ standard sieve, a specific surface area of 3300 $cm^2/g$ measured by the Blaine method, and a temperature of 100°–120° C. The Portland cement of 100°–120° C. from the finishing mill was charged with a continuous volumetric feeder to a biaxial contrarotating paddle mixer (15 rpm) at a rate of 5 T/H. Simultaneously, each aqueous 30 wt % PTFE emulsion A, B, C, D or H mentioned in Tables 1 and 2 was fed with a metering pump at a rate of 16.7 kg/H (PTFE solid 5 kg/H) to be dispersed and mixed. The PTFE fibrillated instantly and distributed homogeneously into the Portland cement to prepare continuously a powdery composition. During the operation, each emulsion A, B, C or D was able to be fed continuously for 200 hours or more, but emulsion H containing the nonionic surfactant caused clogging of the pump with coagulated PTFE, which necessitated interception of the operation after 15–20 hours to remove the coagulated matter.

TABLE 1

| | Example | | | |
|---|---|---|---|---|
| Sample | A | B | C | D |
| Kind of PTFE | homopolymer | homopolymer | homopolymer | homopolymer |
| PTFE content in emulsion (wt %) | 30 | 30 | 30 | 30 |
| Particle size of PTFE colloid (μ) | 0.261 | 0.261 | 0.261 | 0.261 |
| Specific gravity of PTFE colloid particle | 2.160 | 2.160 | 2.160 | 2.160 |
| Kind of emulsion stabilizer | sodium poly oxyethylene octylphenyl ether ethylene sulfonate (n = 2) | sodium poly oxyethylene octylphenyl ether ethylene sulfonate (n = 1) | sodium dodecyl benzene sulfonate | sodium dioctyl sulfo succinate |

TABLE 1-continued

| Sample | Example | | | |
|---|---|---|---|---|
| | A | B | C | D |
| Solvent for emulsion stabilizer | none | none | none | propylene glycol |
| Amount of emulsion stabilizer per PTFE (wt %) | 2.2 | 2.2 | 2.2 | 2.2 |
| Average particle size after agitation ($\mu$) | 0.263 | 0.265 | 0.266 | 0.265 |
| Increased ratio of particle size (%) | 0.8 | 1.5 | 1.9 | 1.5 |
| Mechanical stability | good | good | good | good |
| Dust preventing rate (wt %) | 91.3 | 90.5 | 91.0 | 91.2 |

TABLE 2

| Sample | Comparative Example | | | |
|---|---|---|---|---|
| | E | F | G | H |
| Kind of PTFE | homopolymer | homopolymer | hexafluoro propylene modified polymer | homopolymer |
| PTFE content in emulsion (wt %) | 30 | 30 | 30 | 30 |
| Particle size of PTFE colloid ($\mu$) | 0.261 | 0.196 | 0.162 | 0.247 |
| Specific gravity of PTFE colloid particle | 2.160 | 2.236 | 2.195 | 2.200 |
| Kind of emulsion stabilizer | sodium dioctyl sulfo succinate | sodium dioctyl sulfo succinate | sodium dioctyl sulfo succinate | nonylphenyl poly ethylene glycol (n = 9) |
| Solvent for emulsion stabilizer | propylene glycol | propylene glycol | propylene glycol | none |
| Amount of emulsion stabilizer per PTFE (wt %) | 0.5 | 2.2 | 2.2 | 2.2 |
| Average particle size after agitation ($\mu$) | coagulation | — | 0.162 | 0.279 |
| Increased ratio of particle size (%) | — | — | 0.0 | 13.0 |
| Mechanical stability | bad | — | good | poor |
| Dust preventing rate (wt %) | — | 51.3 | 68.4 | 88.0 |

Test 3

To each 100 g of quick lime being dust prevented by emulsion A, B, C, D or H used in Test 1 was added 1000 ml of water, and agitated with a stirrer (heat generated initially) to prepare a milk of lime. The milk of lime was settled for 2 days and the supernatant liquid was analyzed with a liquid chromatography to detect the emulsion stabilizer. As the result, 0.2 % content of the stabilizer was detected only for emulsion H.

INDUSTRIAL APPLICABILITY

A dust preventing method according to the present invention exhibits improved dust preventing efficiency for powdery materials, and reduces possible contamination of underground water.

What is claimed is:

1. A method for preventing dust of a powdery material comprising the steps of:

mixing said powdery material with a polytetrafluoroethylene; and subjecting the mixture to a compression-shearing action taken at temperatures from about 20° to 200° C. whereby said polytetrafluoroethylene is fibrillated to prevent dusting of the powdery material, and wherein said polytetrafluoroethylene is an aqueous emulsion of a homopolymer of tetrafluoroethylene, said homopolymer having a specific gravity of no larger than 2.20 and an average particle size of 0.10–0.50μ, and said emulsion contains a hydrocarbon-based anionic surfactant of no less than 1.0 % by weight of said polytetrafluoroethylene as a emulsion stabilizer.

2. A method for preventing dust of a powdery material according to claim 1, wherein the hydrocarbon-based anionic surfactant is selected form the group consisting of Na, K, Li and $NH_4$ salts of a polyoxyethylene-alkylphenylether-ethylenesulfonate having —$(CH_2CH_2O)_{1-6}$— with respect to said polyoxyethylene moiety and $C_{8-11}$ alkyl, with respect to said alkylphenylether moiety.

3. A method for preventing dust of a powdery material according to claim 1, wherein the hydrocarbon-based anionic surfactant is selected from the group consisting of Na, K, Li and $NH_4$ salts of an alkylbenzenesulfonic acid wherein the alkyl group has from 10 to 12 carbon atoms.

4. A method for preventing dust of a powdery material according to claim 1, wherein the hydrocarbon-based anionic surfactant is selected from the group consisting of Na, K, Li and $NH_4$ salts of a dialkylsulfosuccinic acid ester wherein the alkyl group has from 8–10 carbon atoms.

* * * * *